United States Patent
Callaway, Jr.

(10) Patent No.: US 6,711,380 B1
(45) Date of Patent: Mar. 23, 2004

(54) METHOD AND APPARATUS FOR REDUCING INTERFERENCE EFFECTS CAUSED BY MICROWAVE SOURCES

(75) Inventor: Edgar Herbert Callaway, Jr., Boca Raton, FL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/578,186

(22) Filed: May 25, 2000

(51) Int. Cl.[7] .................. H04B 5/00; H04B 1/00; H04B 15/00; H04B 17/00; H05B 6/66
(52) U.S. Cl. .................. 455/41.2; 455/88; 455/92; 455/63.1; 455/66.1; 455/67.11; 455/67.15; 455/114.2; 455/151.1; 455/296; 455/507; 219/702
(58) Field of Search ........................ 455/39, 73, 88, 455/92, 63.1, 66.1, 67.11, 67.15, 114.2, 115.1, 151.1, 296, 41.2, 403, 500, 501, 502, 507, 509, 522, 550.1, 556.1; 219/678, 679, 702, 714, 715, 716, 719, 720; 370/347, 368, 470; 375/346, 356, 357

(56) References Cited

U.S. PATENT DOCUMENTS

| | | | | |
|---|---|---|---|---|
| 5,574,979 A | * | 11/1996 | West | 455/63.1 |
| 5,838,741 A | * | 11/1998 | Callaway et al. | 375/346 |
| 6,006,071 A | | 12/1999 | Roberts et al. | 455/63.1 |
| 6,256,478 B1 | * | 7/2001 | Allen et al. | 455/63.1 |
| 6,316,758 B1 | * | 11/2001 | Ubowski et al. | 219/702 |
| 6,346,692 B1 | * | 2/2002 | Ubowski et al. | 219/702 |
| 6,374,082 B1 | * | 4/2002 | Carlson | 455/63.1 |
| 6,496,498 B1 | * | 12/2002 | Kockmann et al. | 370/347 |

* cited by examiner

*Primary Examiner*—Vivian Chin
*Assistant Examiner*—Raymond B Persino
(74) *Attorney, Agent, or Firm*—Randi L. Karpinia

(57) ABSTRACT

A microwave appliance (10) designed to communicate with a plurality of communication devices (11,13, & 15) within a piconet (30) includes a transmitter (24) for communicating with the plurality of communication devices within the piconet; and a processor (22). The processor is programmed to communicate (102) to a master within the piconet about operating information of the microwave appliance, delay bias (104) to a microwave source within the microwave appliance for a predetermined time upon a user request for microwave appliance operation and then return (108) to a normal operating condition.

18 Claims, 3 Drawing Sheets

METHOD AND APPARATUS FOR REDUCING INTERFERENCE EFFECTS CAUSED BY MICROWAVE SOURCES

FIELD OF THE INVENTION

The present invention is directed to microwave interference, and more particularly to a means of reducing microwave interference among a networked plurality of wireless communication devices.

BACKGROUND OF THE INVENTION

Devices using the emerging Personal Area Network (PAN) protocols including Bluetooth HomeRF or 802.11 protocols occupy the same radio frequency spectrum as do microwave ovens. Bursts of RF interference from the microwave oven occurs with a repetition rate equal to that of,the alternating current (ac) line frequency supplying the oven. In microwave ovens in particular, a magnetron is typically supplied by the mains directly, via an autotransformer, with no supply filtering. The resulting RF bursts occur only during one half of the ac cycle. Radiation from microwave ovens may be quite strong (in fact equal in strength to that of a Bluetooth device itself), and quite broadband, covering the entire 2.45 GHz ISM band used by Bluetooth devices. This broadband interference covers all possible Bluetooth channels, so that Bluetooth's principal interference-avoidance strategy (frequency-hopping) is in this case ineffective. Both synchronous voice (SCO) and asynchronous data (ACL) Bluetooth communication links are affected. During half of the ac cycle the SCO voice packets are simply lost, resulting in significantly reduced audio quality, while the ACL links suffer multiple NACKs and reduced data throughput as the links are lost and then reestablished each ac cycle.

A primary market for personal area networks and particularly Bluetooth is at-home use by consumers, as either a cordless telephone system or a home wireless network connecting intelligent appliances. In either of these applications the loss of the personal area network while a microwave oven is on is clearly unacceptable; similarly, operation of the microwave oven cannot be prohibited during use of the personal area network. Thus, a solution is needed to allow microwave ovens and Bluetooth networks to coexist.

A relevant FCC regulation for Bluetooth, Code of Federal Regulations, Title 47, Sec. 15.247, states in paragraph (h): "The incorporation of intelligence within a frequency hopping spread spectrum system that permits the system to recognize other users within the spectrum band so that it individually and independently chooses and adapts its hopsets to avoid hopping on occupied channels is permitted."

Use of algorithms for detecting periodicity on desired signals such as baud detection algorithms is well known. The present invention utilizes a baud detection algorithm in a novel way to identify interference having a particular periodicity (50 or 60 Hz) indicative of microwave oven interference. Conventional noise blankers, which typically blank receiver audio output when a measured noise level exceeds a threshold, are also known in the art, but they differ from the present invention in that they are essentially "real time" devices without memory, and do not distinguish between interference occurring at different repetition rates.

U.S. Pat. No. 5,838,741, (entitled "Communication Device and method for reducing effects of noise introduction by synchronizing data transfer to a received signal," by Callaway, Ansari, Mock, Eaton, and Hayes, issued Nov. 17, 1998) describes an interference avoidance method in which noise-producing activities are timed to occur during periods of the desired signal that are not sensitive to noise (e.g., symbol transitions). The present invention differs from U.S. Pat. No. 5,838,741 in that, in the present invention, the desired system operation is synchronized to existing, externally generated, periodic noise.

U.S. Pat. No. 6,006,071 (entitled "RF Communication System Operable in the Presence of a Repetitive Interference Source and Related Methods") that not only appears to require forward error correction, but also requires the sending of data packets twice. '071 describes a one-way system for wireless speakers where no attempt is made to determine which half-cycle is causing the interference. In essence, data packets are sent twice in synchrony with the AC cycle so that one of the data packets will be in the clear half-cycle. '071 also uses AC sensing external to the oven/appliance, and so it is possible that the sensor and the oven are on different phases of the AC supply (most houses are fed with multiphase AC power). In the present invention, current would be sensed going to the magnetron by phase detector 14 in FIG. 1, eliminating this phase uncertainty. Additionally, in the present invention, any communication between the microwave oven and other devices in a piconet would be synchronous to power supplied to the magnetron, rather than the AC mains themselves as shown in '071.

U.S. Pat. No. 5,574,979 requires tracking an alternating current associated with a power main, whereas the present invention just detects and tracks the periodic interference alone, and is thus suitable for portable battery powered devices.

DETAILED DESCRIPTION

The present invention discloses various methods of mitigating microwave interference among communication devices operating in a personal area network, local area network, or piconet, wherein any of these terms shall hereinafter be referred to synonymously as piconet. In one embodiment, the microwave source causing the interference is left unaltered and the communication devices subject to the interference perform mitigation techniques in response. In another embodiment, the microwave source proactively notifies the communication devices, giving the communication devices an opportunity to operate in modes that would mitigate the interference. In yet another embodiment, the microwave source and the communication devices within the network operate cooperatively to mitigate the interference effects. The present invention is described with respect to Bluetooth devices that detect the presence of a periodic interferer (the oven) and take appropriate mitigating action. In the context of a Bluetooth piconet, a microwave appliance acting as a slave can be used to communicate actively with the Bluetooth piconet master, rather than just exist as a passive noise source. In addition, the present invention could also be embodied having the microwave appliance acting as the piconet master instead of a slave.

Figure 1:
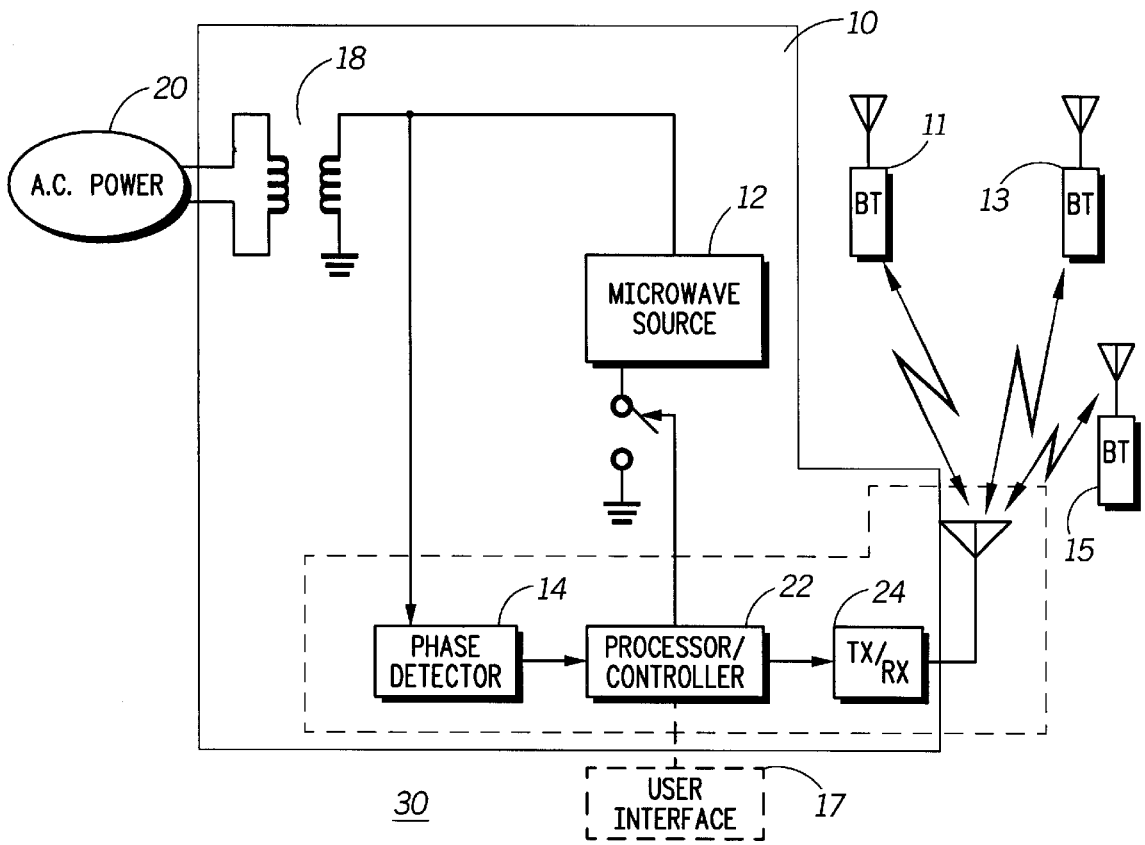
FIG. 1 is a block diagram of an appliance with a microwave source in a personal area network in accordance with the present invention.

In a first embodiment, a microwave appliance such as the Bluetooth-equipped microwave oven 10 operating in a communication network 30 preferably includes the addition of specific functions so that it may inform the master(s) (11, 13, or 15 or 24 when the transceiver 24 acts as a master)) of local piconet(s) (30) of its status as an interfering device as shown in FIG. 1. The masters, in turn, reconfigure their piconets to minimize the effects of the oven interference on their operation.

Ideally, the microwave oven 10 comprises in part a conventional microwave oven including a transformer 18 for converting an alternating current source to an appropriate voltage. The transformer 18 is preferably coupled to a microwave source 12 which is typically a magnetron, but may also be a backward wave oscillator, a traveling wave tube, a klystron, or other microwave source. In addition to the conventional microwave oven components, the microwave oven 10 further comprises phase detector 14 preferably coupled in series with the microwave source 12 to directly measure the phase of the current applied to the microwave source 12. Alternatively, phase detector 14 may be coupled in shunt with the microwave source 12 to directly measure the phase of the voltage applied to the microwave source 12. The phase detector 14 is preferably coupled to a processor or controller 22 and a transceiver 24 such as a Bluetooth transceiver. The transceiver 24 preferably communicates within a piconet of Bluetooth enabled communication devices 11, 13, and 15 as shown. It should be understood, that elements 14, 22, and 24 are shown as additional items to a conventional microwave oven since certain embodiments of the present invention could also operate and mitigate the interference from conventional ovens without these modifications.

Specifically (and assuming the appliance or oven 10 itself is not the piconet master and that device 15 is the master for piconet 30), when a user turns the appliance on, bias to the microwave source 12 is delayed a few milliseconds while the appliance contacts the master device 15 (or the "master") to report that it is about to start. In this report, the oven 10 includes operating information such as the length of time the oven is programmed to run, when it will start (preferably measured in Bluetooth slot times, e.g., 32 slot times [10 milliseconds] from now), the phase of the ac cycle, etc. The master then has sufficient advance warning and description of the impending interference to take appropriate countermeasures, such as increasing transmit power, synchronizing the piconet operation with the "quiet" half of the ac cycle (as opposed to the "noisy" half of the ac cycle), placing unneeded slaves in lower-power Bluetooth modes (sniff, hold, park) for the duration of the interference, etc. If the oven is itself the piconet master, these countermeasures are taken using the same operating information. The oven can even communicate a new status to the piconet master such as when the oven is turned off prematurely (due to the user opening the oven door, for example). This fact is reported to the piconet master, which may return the piconet to its previous configuration. Note that, by transmitting and receiving during the "quiet" half of the ac cycle, the microwave oven can remain an active participant of the Bluetooth piconet even while the oven is operating.

Figure 2:
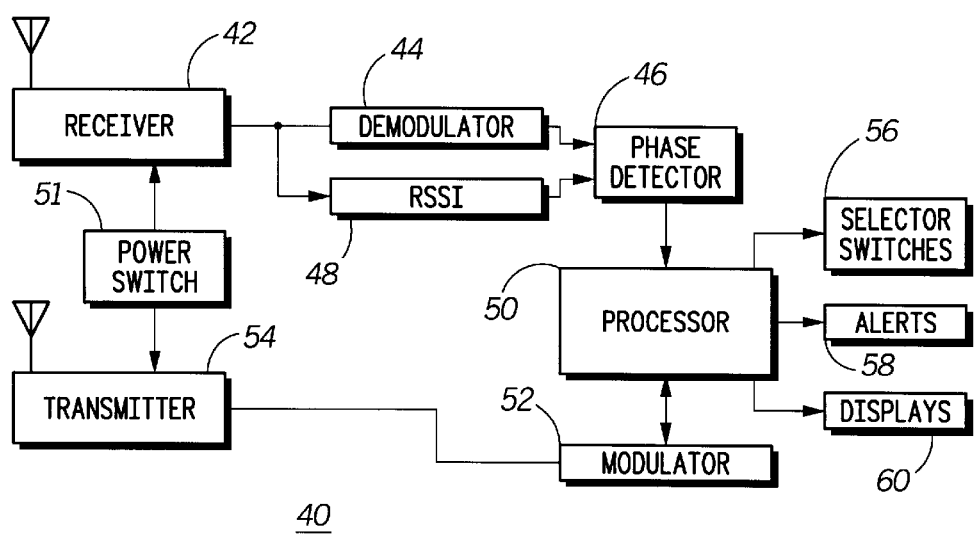
FIG. 2 is a block diagram of a communication device capable of receiving and mitigating the effects of microwave interference in accordance with the present invention.

In another embodiment of the present invention, a method uses a periodicity-determining algorithm, e.g., the Skunk baud detection algorithm, on a channel metric to detect the existence of a particular periodic interferer, to which the Bluetooth device adapts to maximize the channel quality of service. Said more simply, an algorithm preferably detects the presence of a 50 or a 60 Hz interfering noise from a microwave oven. The Bluetooth device then synchronizes its operation to the noise, operating only during the half-cycle periods when the interfering signal is silent. A communication device 40 capable of utilizing the algorithm described above and as will be described in further detail below is shown in FIG. 2. The communication device 40 preferably comprises a receiver 42 coupled to a phase detector 46 via a corresponding demodulator 44, and received signal strength indicator (RSSI) 48. The device 40 also preferably comprises a transmitter 54 coupled to a corresponding modulator 52. The transmitter and receiver as well as the modulator and demodulator are preferably coupled to a processor 50 which controls many of the operating functions of the communication device 40. Additionally, the processor 50 may also be coupled to selector switches 56, alerts 58, displays 60 and power switches 51 as is well known in the art.

If one considers the 50 Hz ac mains found in Europe, a microwave oven noise burst may last 10 ms, followed by a 10 ms silent period. Bluetooth operates with a slot rate of 1600 slots/s (625 us/slot); in a 10 ms period there are 10/0.625=16 slots. With this number of slots per oven noise burst, the Bluetooth device may employ one or more of several channel quality metrics as an input to the periodicity-determining algorithm. It may monitor the number of corrupted packets (or NACKs) received, or it may track only corrupted packets received with a Received Signal Strength Indicator (RSSI) value above some threshold. With some loss in battery life, it may even track RSSI levels in between piconet transmission times, when no desired signals should be present.

Whatever metric is used, it is checked for the presence of 50 Hz periodicity. What happens when it is found depends on whether the Bluetooth device is the master of the piconet, or a slave. If the Bluetooth device is the master, it reorganizes the piconet; it reschedules piconet traffic such that communication is not scheduled during the noisy half-cycle. Inactive slaves may be placed in Hold, Sniff, or Park mode, improving their battery life by reducing their duty cycle. If the Bluetooth device is a slave, it reports the phase of the noise to the master; the master then knows not to attempt contact with the slave during the noisy periods, and may in fact place the slave in Hold, Sniff, or Park mode, to reduce its activity during the noisy periods. If the transmitting Bluetooth device is equipped with power control, another interference-mitigating strategy is to maximize transmit power during the noise bursts.

While it may seem that many Bluetooth slots may get blocked before detecting the periodic noise (the algorithm may require a cycle or two of 50 Hz noise to detect it reliably—at 32 Bluetooth slots per cycle), microwave ovens are generally on for minutes at a time, and there are 96,000 Bluetooth slots in a minute. There is, therefore, much to be gained by mitigating microwave oven interference.

Figure 3:
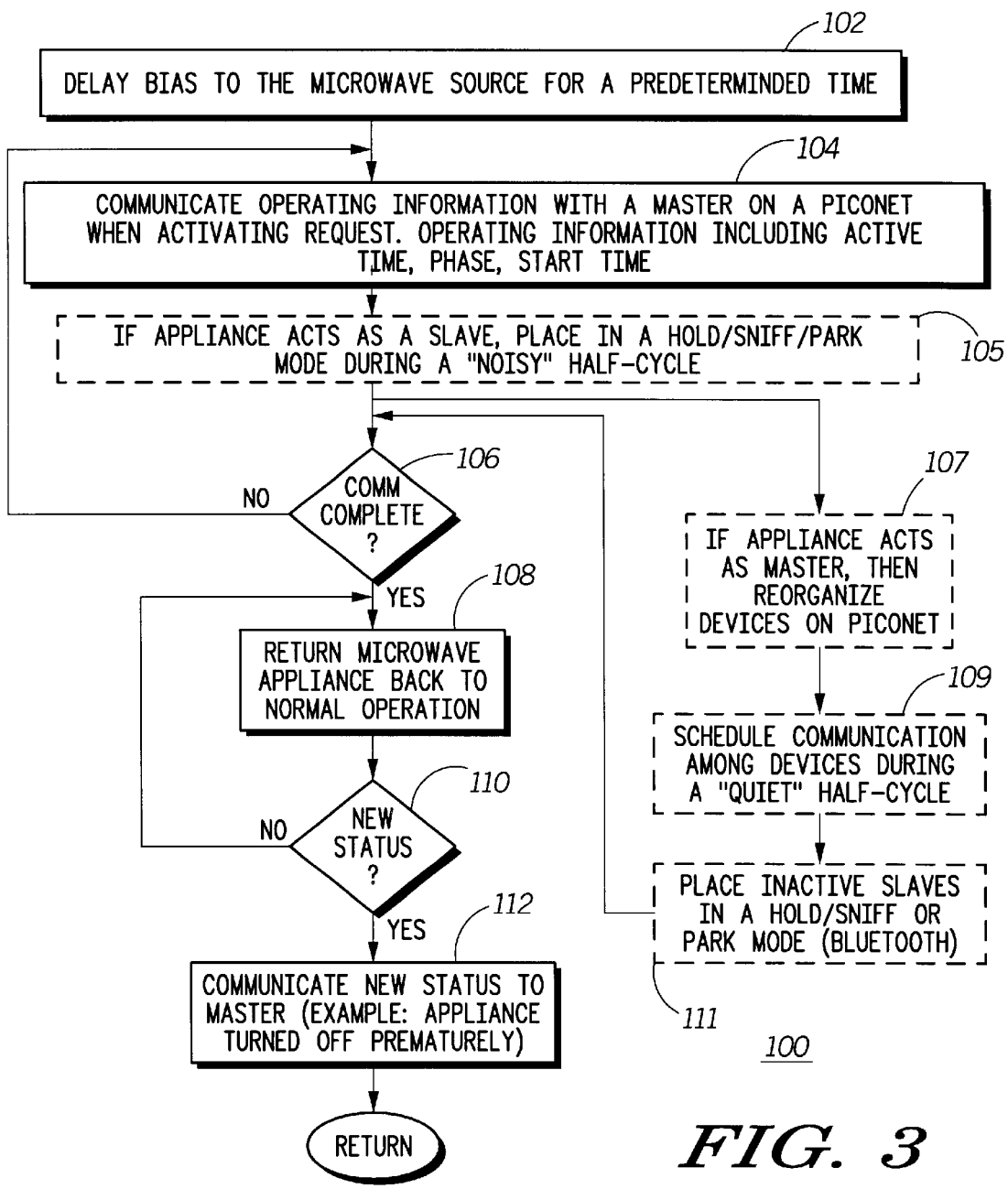
FIG. 3 is a flow chart illustrating a method of mitigating microwave interference from a microwave appliance in accordance with the present invention.

Referring to FIG. 3, a flow chart illustrates a method 100 of microwave source control to limit signal interference among a plurality of devices communicating in a piconet operating as master and slaves within a predetermined proximity of a microwave source. In step 102, the method would delay applying bias to the microwave source within the appliance for a predetermined time. Next at step 104, a microwave appliance preferably communicates with a master within the piconet about operating information of the microwave source upon a request for activation of the microwave source. The operating information can comprise one or more of the following: a length of time or times the microwave source is programmed to be active; when the microwave source will begin operation; or the phase of an alternating current cycle the microwave source is operating on. It should be understood within contemplation of the present invention that the predetermined time can simply be the delay inherent in activating the microwave source (e.g., time required for filament heating). The predetermined time should also be understood as being a static delay of a fixed duration or a dynamic delay based upon termination of desired functions such as completing communications between the appliance and the master.

At this point, the master can direct the appliance into a Hold, Sniff, or Park mode without receiving a request from the appliance. Next, the method at decision block 106 determines whether communication with the master is complete. In effect, this allows the microwave source to delay bias to the microwave source until the microwave source completes communication to the master about its operating information. Once the communication is complete, the method returns the microwave source to a normal operating condition at step 108. In the interim, if the microwave appliance has a new status at decision block 110, the method further comprises the step 112 of communicating with the master of such new status. For example, such new status could be if the appliance is turned off prematurely. If there is no new status at decision block 110, the appliance returns to normal operation as shown.

If the appliance operates as a piconet slave, then the method further comprises the alternative step of requesting to be placed in a Hold, Sniff, or Park mode while the microwave source is operating during a noisy half-cycle as shown in step 105. Subsequently, the master responds by placing such piconet slave in the appropriate mode.

If the appliance operates as a master of the piconet, then the method may further comprise the alternate steps 107 of re-organizing the plurality of devices communicating on the piconet by the appliance and 109 of rescheduling communication among the plurality of devices such that communication among the plurality of devices is not scheduled during a noisy half-cycle of operation of the appliance and/or the step 111 of placing inactive slaves among the plurality of devices into a Hold, Sniff, or Park mode. This can also mean that the appliance operating as a master within the piconet would also be placed in a Hold, Sniff, or Park mode while the microwave source is in operation.

Figure 4:
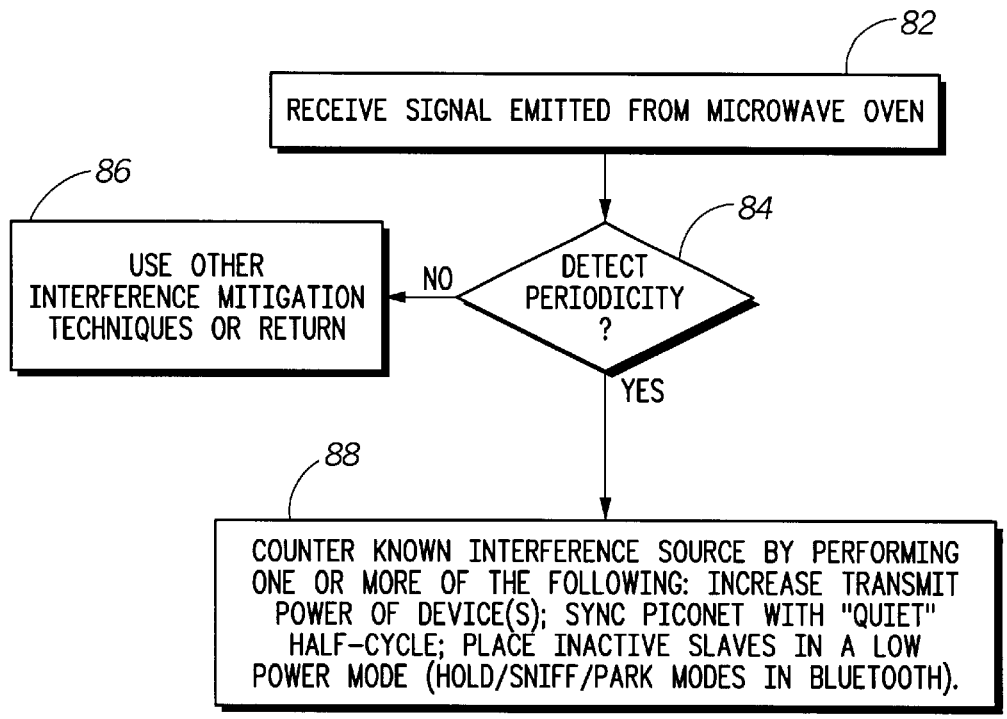
FIG. 4 is a flow chart illustrating a method of operating a communication device subject to microwave interference within a communication network in accordance with the present invention.

FIG. 4 is a flow chart illustrating a method 80 of operating a communication device within a piconet that is subject to interference from signals emitted by a microwave oven, wherein the oven is not specifically designed to "communicate" with the communication devices on the piconet. The method 80 preferably comprises the step 82 of receiving the signals emitted from the microwave oven in operation at the communication device and the step of detecting periodicity or a quiet half cycle from the signals emitted from the microwave oven as shown in decision block 84. Detecting demodulated noise, corrupt packets, RSSI, or some combination thereof could be used as an input to the periodicity detection algorithm used at decision block 84. Typically, the step of detecting comprises the step of detecting a 50 or 60 Hertz periodic noise. Alternatively, the detection step could also comprise (as previously mentioned) the steps of detecting a number of corrupted packets, particularly when a received signal strength measurement is above a predetermined threshold and when no desired signals are found. If a "noisy" half cycle or a "quiet" half cycle is not detected, then the master at step 86 may utilize other interference mitigation techniques or otherwise return to normal operation. If periodic noise (i.e., containing a "noisy" or "quiet" half cycle) is detected, then the master goes on at step 88 to counter the interference. Such countering could include as previously discussed increasing the transmit power of the communication device; synchronizing the piconet operation with the quiet half cycle; operating the communication device only during the quiet half cycle; or placing unneeded slaves in the piconet in a low-power mode during a period of quiet half cycle detection.

Figure 5:
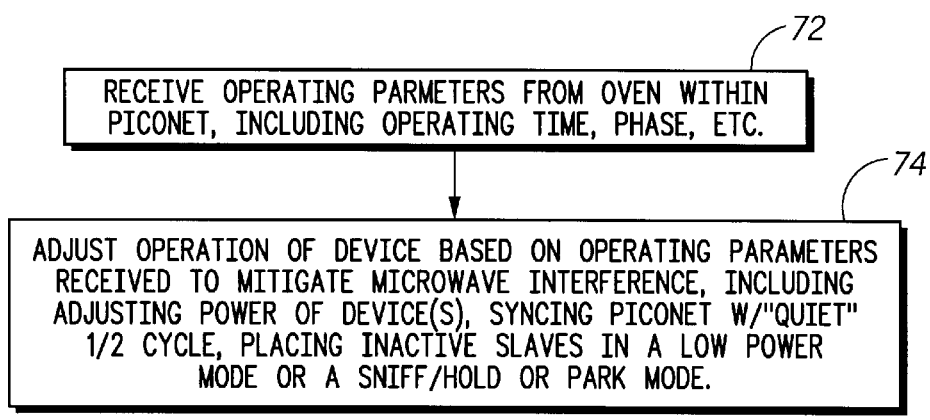
FIG. 5 is another flow chart illustrating a method of operating a communication device subject to microwave interference within a communication network in accordance with the present invention.

FIG. 5 is another flow chart illustrating a method 70 of operating a communication device within a piconet that is subject to interference from signals emitted by a microwave oven designed specifically to communicate with the communication device. Instead of receiving microwave interference and detecting such interference as in method 80 of FIG. 4, the communication device within the piconet receives information from the microwave oven concerning the microwave oven's operating parameters at step 72 and then adjusts the operation of the communication device at step 74 based on the information received from the microwave oven to mitigate such interference effects. Again, such operating parameters can comprise, among other things, a length of time the microwave oven is programmed to run, when the microwave oven will begin operation, or the phase of an alternating current cycle the microwave oven is operating on. As previously described, the adjustments could also comprise among other things increasing the transmit power of the communication device, synchronizing the piconet operation with the quiet half cycle, operating the communication device only during the quiet half cycle, or placing unneeded slaves in the piconet in a low-power mode during a period of quiet half cycle detection.

The above description is intended by way of example only and is not intended to limit the present invention in any way except as set forth in the following claims.

What is claimed is:

1. A method of microwave source control within an appliance to limit signal interference among a plurality of devices communicating in a piconet, comprising the steps of:

delaying bias to a microwave source within the appliance for a predetermined time; and communicating with a member of the piconet about operating information of the microwave source upon a request for activation of the microwave source.

2. The method of claim 1, wherein the plurality of devices communicating in the piconet operate as master and slaves.

3. The method of claim 1, wherein the method further comprises the step of returning the microwave source to a normal operating condition.

4. The method of claim 1, wherein the step of delaying bias to the microwave source comprises delaying bias to the microwave source until the microwave source completes communication to the master about its operating information.

5. The method of claim 1, wherein the step of communicating further comprises the step of communicating information selected from the group comprising a length of time or times the microwave source is programmed to be active, when the microwave source will begin operation, or the phase of an alternating current cycle the microwave source is operating on.

6. The method of claim 1, wherein the method further comprises the step of communicating with the master of a new status if the appliance is turned off prematurely.

7. The method of claim 1, wherein if the appliance operates as a master of the piconet, then the method further comprises the step of re-organizing the plurality of devices communicating on the piconet by the appliance.

8. The method of claim 7, wherein the step of re-organizing comprises the step of rescheduling communication among the plurality of devices such that communication among the plurality of devices is not scheduled during a noisy half-cycle of operation of the appliance.

9. The method of claim 7, wherein the step of re-organizing comprises the step of placing inactive slaves among the plurality of devices into a hold, park, or sniff mode.

10. The method of claim 1, wherein if the appliance operates as a slave of the piconet, then the method further comprises the step of placing the appliance in a hold, park, or sniff mode while the microwave source is in operation.

11. The method of claim 1, wherein if an appliance having the microwave source operates as a slave of the piconet, then the method further comprises the step of making a request to the master for a change in mode by the appliance and subsequently placing the appliance in a hold, park or sniff mode while the microwave source is operating during a noisy half-cycle.

12. The method of claim 1, wherein the step of communicating operating information of the microwave source comprises the step of detecting phase information applied to a magnetron directly acting as the microwave source.

13. A method of operating a communication device within a piconet that is subject to interference from signals emitted by a microwave oven designed to communicate with the communication device, comprising the steps of:

receiving information from the microwave oven concerning the microwave oven's operating parameters; and adjusting the operation of the communication device based on the information received from the microwave oven to mitigate interference effects.

14. The method of claim 13, wherein the step of receiving information from the microwave oven comprises the step of receiving information selected from the group comprising a length of time the microwave oven is programmed to run, when the microwave oven will begin operation, or the phase of an alternating current cycle the microwave oven is operating on.

15. The method of claim 13, wherein the step of adjusting the operation of the communication device is selected from the group of steps comprising increasing the transmit power of the communication device, synchronizing the piconet operation with the quiet half cycle, operating the communication device only during the quiet half cycle, or placing unneeded devices in the piconet in a low-power mode during a period of quiet half cycle detection.

16. A microwave appliance designed to communicate with a plurality of communication devices within a piconet, comprises:

a transmitter for communicating with the plurality of communication devices within the piconet; and a processor programmed to:
communicate to a master within the piconet about operating information of the microwave appliance;
delay bias to a microwave source within the microwave appliance for a predetermined time upon a user request for microwave appliance operation; and
return the microwave appliance to a normal operating condition.

17. The microwave appliance of claim 16, wherein the microwave source is selected from the group consisting of a magnetron, a backward wave oscillator, a traveling wave tube, or a klystron.

18. The microwave appliance of claim 16, wherein the microwave appliance further comprises a receiver coupled to the processor.

* * * * *